US011208769B2

(12) United States Patent
Graves et al.

(10) Patent No.: US 11,208,769 B2
(45) Date of Patent: Dec. 28, 2021

(54) SCREED EXTENSION ATTACHMENT SYSTEM (71) Applicant: Caterpillar Paving Products Inc., Brooklyn Park, MN (US)

(72) Inventors: Cameron Eitel Graves, Summerset, SD (US); John Eron Jorgensen, Andover, MN (US); Toby Andrew Frelich, St. Michael, MN (US); Tim Wehrenberg, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 95 days.

(21) Appl. No.: 16/819,261

(22) Filed: Mar. 16, 2020

(65) Prior Publication Data
US 2021/0285167 A1   Sep. 16, 2021

(51) Int. Cl.
*E01C 19/48* (2006.01)
*E01C 19/42* (2006.01)
*F16B 5/02* (2006.01)

(52) U.S. Cl.
CPC ............ *E01C 19/42* (2013.01); *F16B 5/02* (2013.01); *E01C 2301/14* (2013.01)

(58) Field of Classification Search
CPC ...... E01C 19/42; E01C 19/48; E01C 2301/14; F16B 5/02
USPC ...................................................... 404/118
See application file for complete search history.

(56) References Cited

U.S. PATENT DOCUMENTS

| 5,203,642 | A | * | 4/1993 | Heller | E01C 19/40 |
| | | | | | 404/118 |
| 6,019,544 | A | * | 2/2000 | Emerson | E01C 19/405 |
| | | | | | 404/104 |
| 6,158,921 | A | | 12/2000 | Holmes | |
| 6,174,105 | B1 | | 1/2001 | Holmes et al. | |
| 6,595,719 | B1 | * | 7/2003 | Ohseki | E01C 19/48 |
| | | | | | 404/118 |
| 9,187,868 | B2 | * | 11/2015 | Smieja | E01C 19/42 |
| 10,208,435 | B2 | * | 2/2019 | Stallgies | E01C 19/48 |
| 10,260,205 | B2 | * | 4/2019 | Laugwitz | E01C 19/4873 |
| 10,480,132 | B1 | * | 11/2019 | Jennings | E01C 19/48 |
| 2015/0284919 | A1 | * | 10/2015 | Smieja | E01C 19/48 |
| | | | | | 404/118 |
| 2016/0040369 | A1 | * | 2/2016 | Wang | E01C 19/38 |
| | | | | | 404/114 |
| 2019/0186085 | A1 | | 6/2019 | Parrilla et al. | |
| 2021/0172129 | A1 | * | 6/2021 | Wenzelmann | E01C 19/42 |

FOREIGN PATENT DOCUMENTS

EP         3085834 B1    2/2018

* cited by examiner

*Primary Examiner* — Raymond A Addie (57) ABSTRACT

A system for attaching a mounting wall of a screed extension to a screed assembly including a first mounting component configured to be engaged within a first receptacle provided on the mounting wall. The first mounting component includes a first fastening member. The system further includes a second mounting component configured to be received within a second receptacle provided on the mounting wall. The second mounting component includes a second fastening member to engage with the first mounting member on the mounting wall and a mounting catch to engage with a mating wall of the screed assembly.

20 Claims, 10 Drawing Sheets

SCREED EXTENSION ATTACHMENT SYSTEM

TECHNICAL FIELD

The present disclosure generally relates to a screed assembly for a paving machine. More particularly, the present disclosure relates to a screed extension attachment system for attaching a screed extension to the screed assembly.

BACKGROUND

Paving machines are commonly known to use asphalt material for the purposes of laying or forming surface roads. Generally, the asphalt material is deposited, leveled and compacted by a screed assembly located at a rear of the paving machine to form an asphalt mat. These paving machines include an operator station for permitting an on-board operator to ensure that the asphalt material is properly placed, and that the resulting road surface is properly laid.

A width of the screed assembly may be adjustable to adapt to a desired width of the asphalt mat to be laid. Mechanical screed extensions, such as bolt-on screed extensions, are commonly known to be installed on the screed assembly for increasing a paving width of the screed assembly. Generally, bolt-on extensions are heavy and require additional equipment for lifting and installing them to a main screed of the screed assembly. Further, installation of such bolt-on screed extensions requires proper positioning and alignment of the screed extension to the main screed to achieve an even and smoothly laid asphalt mat on the surface. However, attaching and positioning such bolt-on screed extensions is laborious, costly and time consuming.

U.S. Pat. No. 6,174, 105 (hereinafter referred to as the '105 patent) provides a strike-off device for a paving screed having a main screed and a screed extension attached to the main screed, wherein the screed extension has a generally vertical front surface. The strike-off device includes a plate disposed frontwardly of and adjacent to the screed extension. The plate has a generally horizontal working edge extending laterally along the front vertical surface of the screed extension. Two connective members extend between the strike-off plate and the screed extension and are configured to adjustably attach the plate to the screed extension, such that vertical displacement of the connective members adjusts a vertical position of the strike-off working edge. The connective members are each a threaded rod having a first end engaged with the strike-off plate and a second end engaged with the screed extension, such that rotation of the rods displace the strike-off plate in vertical directions.

SUMMARY OF THE INVENTION

In an aspect of the present disclosure, a system for attaching a mounting wall of a screed extension to a screed assembly is provided. The system includes a first mounting component configured to be engaged within a first receptacle provided on the mounting wall. The first mounting component includes a first fastening member. The system further includes a second mounting component configured to be received within a second receptacle provided on the mounting wall. The second mounting component includes a second fastening member to engage with the first mounting member on the mounting wall and a mounting catch to engage with a mating wall of the screed assembly.

In another aspect of the present disclosure, a screed extension for a screed assembly is provided. The screed extension includes a mounting wall configured to be attached to a mating wall of the screed assembly. The mounting wall includes a first receptacle provided and a second receptacle. The screed extension further includes a screed extension attachment system coupled to the mounting wall for attaching the screed extension to the mating wall of the screed assembly. The screed extension attachment system includes a first mounting component engaged within the first receptacle on the mounting wall. The first mounting component includes a first fastening member. The system further includes a second mounting component received within a second receptacle on the mounting wall. The second mounting component includes a second fastening member engaged with the first mounting member on the first mounting component and a mounting catch configured to engage with the mating wall of the screed assembly.

In a yet another aspect of the present disclosure, a screed assembly is provided. The screed assembly includes a main screed defining a lateral extension axis and including a mating wall having a first longitudinal axis. The mating wall includes a first cavity extending along the first longitudinal axis and defines a catch protrusion therein. The screed assembly further includes a screed extension attached to the main screed. The screed extension includes a frame defining a second longitudinal axis and a mounting wall extending along the second longitudinal axis to define a top end and a bottom end. The mounting wall is attached to the mating wall of the screed assembly. The mounting wall includes a first receptacle provided at the top end and a second receptacle extending along the longitudinal axis. The screed extension further includes a screed extension attachment system coupled to the mounting wall and attaching the screed extension to the mating wall of the screed assembly. The screed extension attachment system includes a first mounting component disposed longitudinally along the mounting wall and engaged within the first receptacle on the mounting wall. The first mounting component includes a threaded end. The system further includes a second mounting component disposed transversely to the first mounting component and received within a second receptacle on the mounting wall. The second mounting component includes a threaded receptacle engaged with the threaded end of the first mounting member and a mounting catch engaged with the catch protrusion of the mating wall of the screed assembly.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
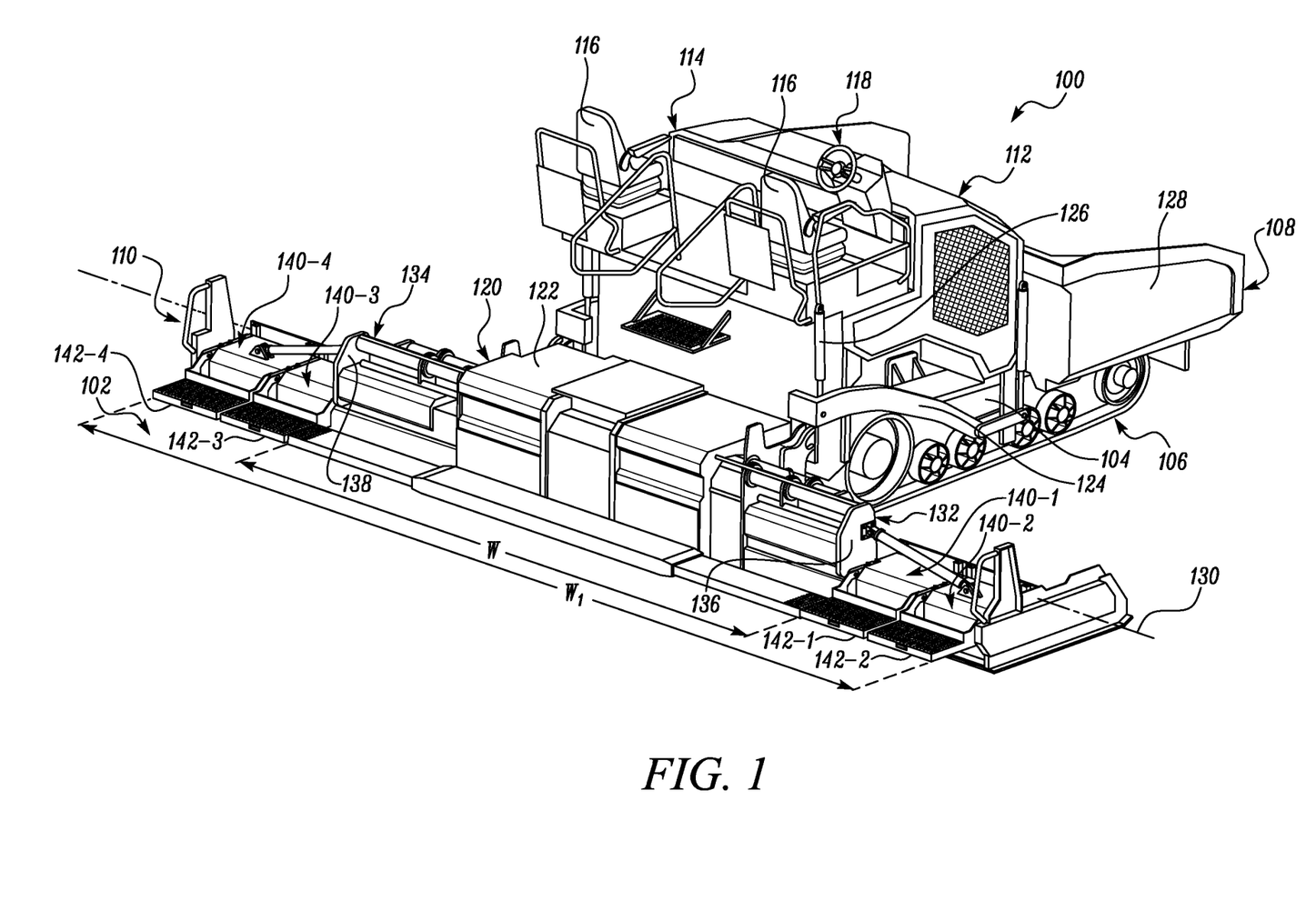
FIG. 1 illustrates an exemplary paving machine operating on a paving surface, in accordance with the embodiments of the present disclosure.

The present disclosure relates to a screed extension attachment system for attaching a screed extension to a screed assembly of an asphalt paving machine. FIG. 1 illustrates an exemplary paving machine 100 in accordance with the various embodiments of the present disclosure. The paving machine 100 may be an asphalt paver or any other machine used to distribute a layer of paving material on a paving surface 102.

The machine 100 includes a frame 104 with a set of ground engaging members 106, such as wheels or tracks, coupled with the frame 104. The frame 104 includes a front portion 108 and a rear portion 110. The machine 100 further includes a tractor portion 112 supported on the frame 104. The tractor portion 112 includes a power source (not shown) and an operator station 114. The power source may be an engine, such as an internal combustion engine, configured to power operations of various systems on the machine 100, such as the ground engaging members 106. The operator station 114 includes one or more operator seats 116 and a console 118, that may include various controls for directing operations of the machine 100. For example, the console 118 may include one or more steering wheel, touch screens, joysticks, switches etc., to facilitate an operator in operating the machine 100 and the components of the machine 100.

The machine 100 includes a screed assembly 120 configured to spread and compact paving material into a layer or mat (not shown) of a desired width, thickness, size and uniformity on the paving surface 102. In an exemplary embodiment, the screed assembly 120 includes a free-floating or a self-levelling main screed 122 (hereinafter interchangeably referred to as the screed 122) coupled to the machine 100, via tow arms 124, at a drop arm (not shown) of the screed assembly 120. The screed assembly 120, and more particularly the screed 122, may be raised or lowered by raising or lowering the tow arms 124 via one or more tow arm cylinders 126. The tow arm cylinders 126 may be hydraulically or pneumatically operated to raise and/or lower the screed assembly 120. For example, a desired grade (or thickness) and slope of the mat may be obtained by adjusting a height and inclination/tilt, respectively, of the screed 122.

The machine 100 further includes a hopper 128 supported on the front portion 108 of the frame 104 and configured to receive and store the paving material. A conveyor system having one or more conveyors (not shown) is further configured to move the paving material from the hopper 128 to the screed assembly 120.

The main screed 122 defines a lateral extension axis 130 along which, a width of the screed assembly 120 may be adjusted to adapt to the desired paving operations. The main screed 122 defines a first lateral end 132 and a second lateral end 134 along the lateral extension axis 130, wherein each of the first lateral end 132 and the second lateral end 134 includes a side mounting wall, such as a first side mounting wall 136 on the first lateral end 132 and a second side mounting wall 138 on the second lateral end 134.

As illustrated, one or more screed extensions 140 may be attached to the main screed 122 to increase a paving width W of the machine 100 to paving width W1, along the lateral extension axis 130. In the illustrated example, four screed extensions 140-1, 140-2, 140-3, and 140-4, are attached to the main screed 122 of the screed assembly 120. For example, two screed extension 140-1, 140-2 are attached to the first lateral end 132, whereas, two screed extensions 140-3, 140-4 are attached to the second lateral end 134 of the main screed 122. Each of the screed extensions 140 include a respective extender plate 142-1, 142-2, 142-3, and 142-4 to widen and narrow, as required to lay the appropriate width of the mat for a particular paving job. Although there are four screed extensions 140 shown and described in the present disclosure, it may be contemplated that the number of screed extensions 140 attached to the main screed 122 may be varied according to a desired paving operation to be performed by the machine 100.

Figure 2:
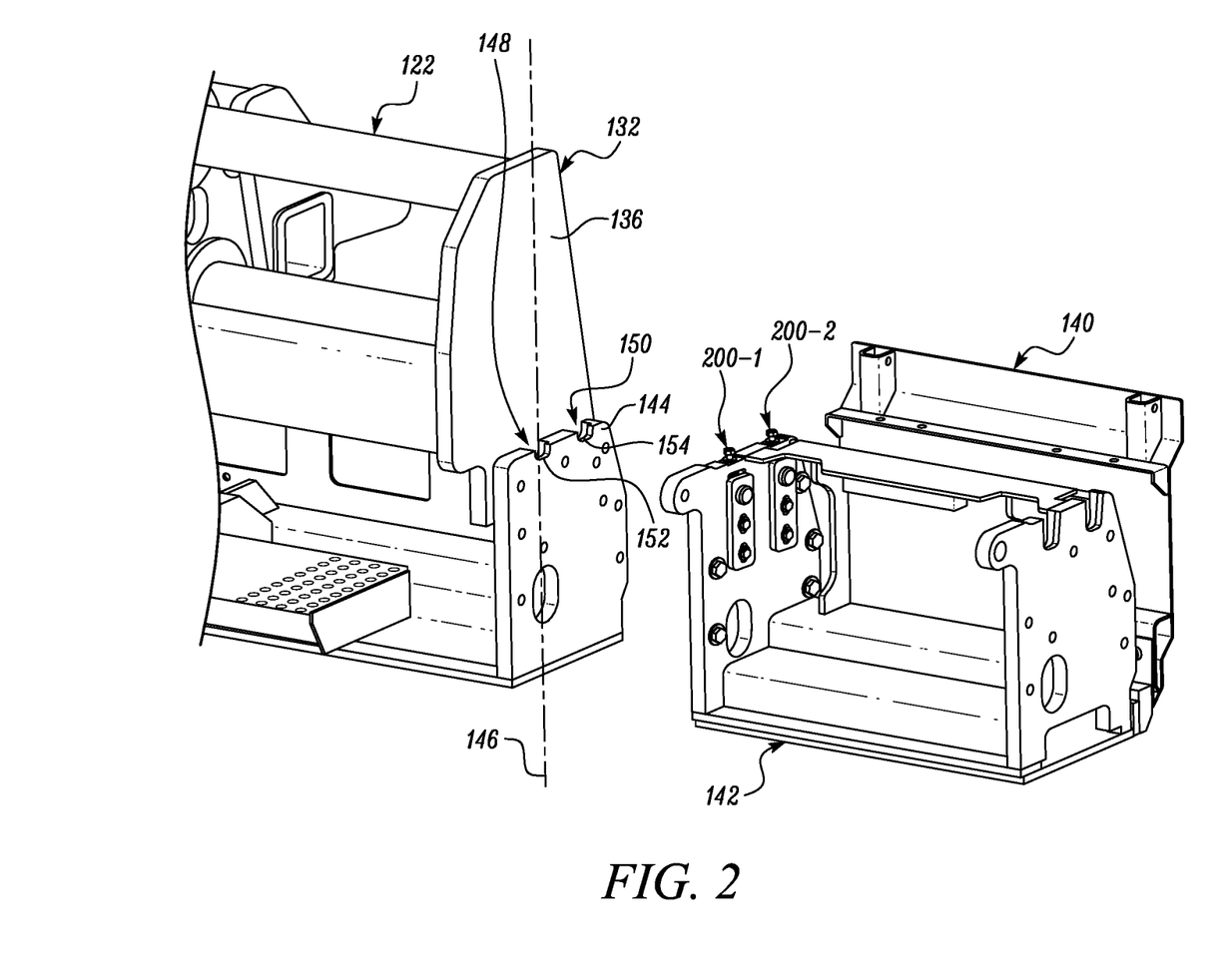
FIG. 2 illustrates an exemplary screed extension and a section of main screed of the screed assembly to be attached together, in accordance with the embodiments of the present disclosure.

The main screed 122 includes a mating wall 144 (shown in FIG. 2) provided on the side mounting wall, such as the first side mounting wall 136 and defines a first longitudinal axis 146. In an exemplary implementation, the mating wall 144 includes a pair of cavities 148, 150, each defining a respective catch protrusion 152, 154 formed therein. The cavities 148, 150 may be U-shaped machined cavities extending along the first longitudinal axis 146. Similarly, the other side mounting wall, i.e., the second side mounting wall 138 may also include a mating wall having cavities and catch protrusions formed therein, identical to the ones on the mating wall 144. Further, it may be contemplated that the number of cavities and catch protrusions formed on the mating wall 144 are merely exemplary and may be varied to achieve similar results without deviating from the scope of the claimed subject matter. It may also be contemplated that the main screed 122 and the side mounting walls 136 may include additional components that are not described in detail for the sake of brevity of the disclosure.

In an embodiment of the present disclosure, the screed extension 140 is attached to the mating wall 144 of the main screed 122 by one or more screed extension attachment system 200. In an alternative embodiment, the screed extension 140 may be attached to a mating wall on another screed extension of the screed assembly 120 by the screed extension attachment system 200.

Figure 3:
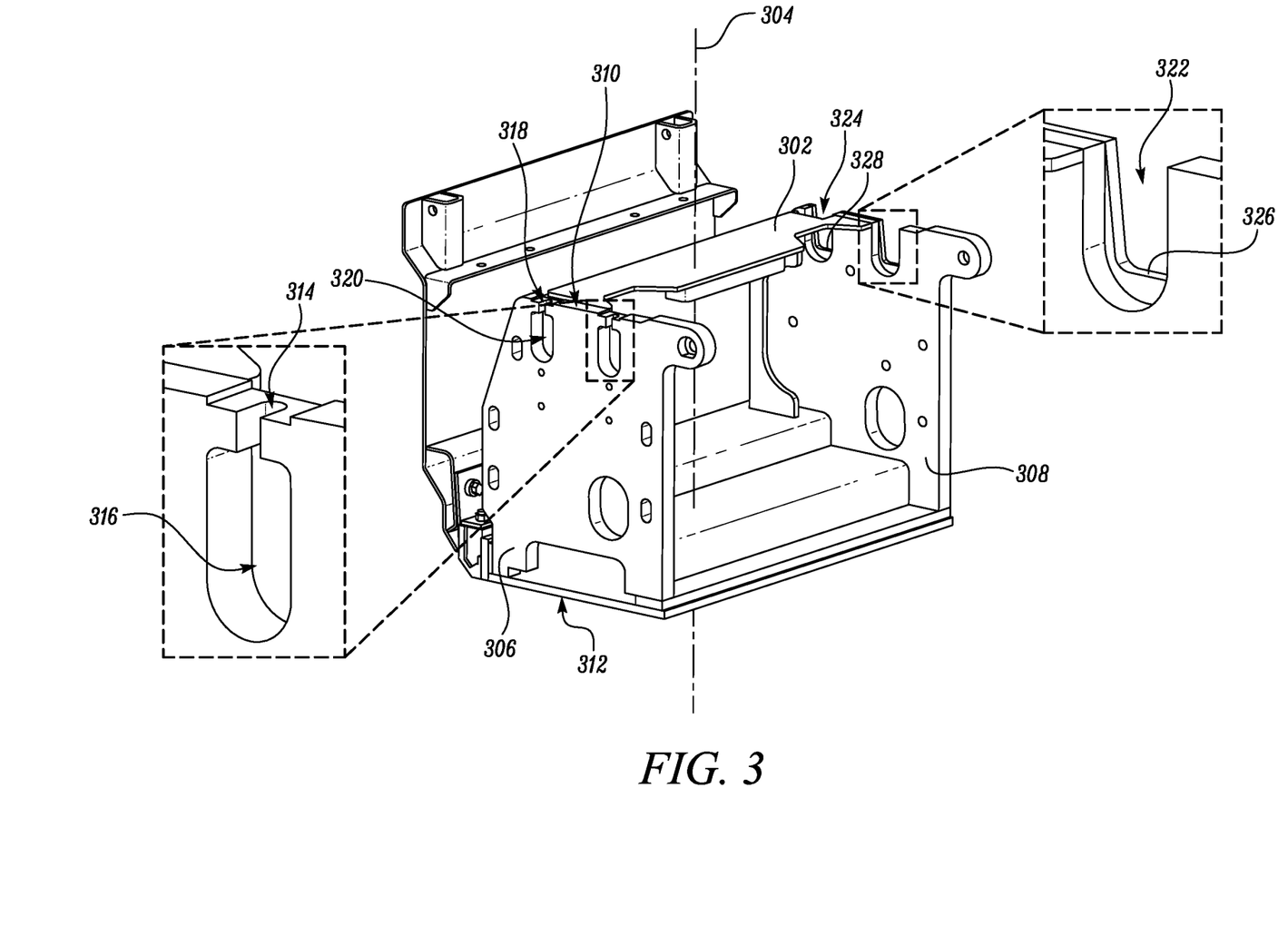
FIG. 3 illustrates an exemplary screed extension, in accordance with the embodiments of the present disclosure.

Referring to FIG. 3, the screed extension 140 includes a frame 302 defining a longitudinal axis 304, hereinafter referred to as the second longitudinal axis 304, of the screed extension 140. The second longitudinal axis 304 is configured to be parallel to the first longitudinal axis 146 when the screed extension 140 is attached to the main screed 122. The screed extension 140 includes a mounting wall 306 configured to attach to the mating wall 144 on the main screed 122 and an external mating wall 308 configured to act as a mating wall for another screed extension to attach adjacent thereto.

The mounting wall 306 defines a top end 310 and a bottom end 312 along the longitudinal axis 304. In an embodiment of the present disclosure, the mounting wall 306 includes a first set of mounting receptacles including a first receptacle 314 formed at the top end 310 and a second receptacle 316 extending downwardly from the top end 310 towards the bottom end 312. As shown, the first receptacle 314 is a U-shaped machined receptacle extending transversely to the second longitudinal axis 304. Further, the second receptacle 316 is a U-shaped machined receptacle extending downward from the top end 310 and the first receptacle 314 along the longitudinal axis 304. In the illustrated embodiment, the mounting wall 306 also includes a second set of mounting receptacles spaced laterally apart from the first set of mounting receptacles. The second set of mounting receptacles includes a third receptacle 318 identical to the first receptacle 314 and a fourth receptacle 320 identical to the second receptacle 316. Thus, the third receptacle 318 is also a machined U-shaped receptacle extending transversely to the second longitudinal axis 304 whereas the fourth receptacle 320 is a machined U-shaped receptacle extending downwardly from the top end 310 and the third receptacle 318 along the second longitudinal axis 304. In an embodiment of the present disclosure, the number of sets of mounting receptacles formed on the mounting wall 306 of the screed extension 140 is equal to the number of cavities formed on the mating wall 144 of the main screed 122. It may be contemplated that the shape and number of sets of mounting receptacles provided on the mounting wall 306 of the screed extension 140 is merely exemplary and may be varied to achieve similar results without deviating from the scope of the claimed subject matter.

Further, the external mating wall 308 of the screed extension 140 includes a pair of cavities 322, 324, extending downwardly along the longitudinal axis 304. In an embodiment of the present disclosure, each of the cavities 322, 324 defines a respective catch protrusion 326, 328 formed respectively therein. In some embodiments, the cavities 322, 324 and the catch protrusions 326, 328 formed on the external mating wall 308 of the screed extension 140 may be similar or identical to the cavities 148, 150 and the catch protrusions 152, 154 formed on the mating wall 144 of the main screed 122. The external mating wall 308 of the screed extension 140 may be functionally similar to the mating wall 144 on the main screed 122.

Figure 4:
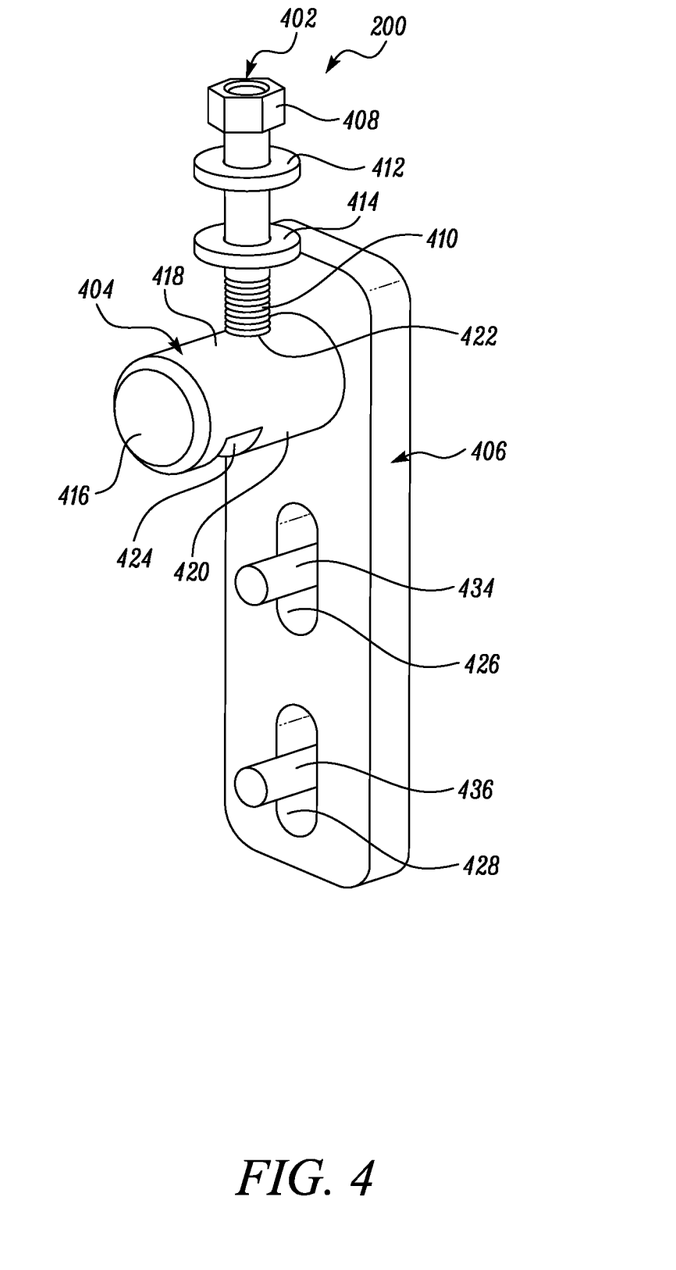
FIG. 4 illustrates an exemplary screed extension attachment system for attaching a screed extension to the screed assembly, in accordance with the embodiments of the present disclosure.

FIG. 4 illustrates the exemplary screed extension attachment system 200, hereinafter interchangeably referred to as the system 200, for attaching the screed extension 140 to the mating wall 144 of the main screed 122 or to the external mating wall of an adjacent screed extension. In the illustrated embodiment, each of the set of mounting receptacles formed on the mounting wall 306 is configured to be engaged and coupled with a respective screed extension attachment system 200 therein at the time of assembling the screed extension 140. The assembled screed extension 140 along with the screed extension attachment systems 200 is then retrofitted on to a mating wall on the screed assembly 120, i.e., the mating wall 144 on the main screed 122 or to an external mating wall 308 of another screed extension 140.

Since the illustrated embodiment shows two sets of mounting receptacles i.e., 314-316 and 318-320, there are two screed extension attachment systems 200-1, 200-2, one engaged and coupled to each of them. However, it may be contemplated that the number of mounting receptacles formed on the mounting wall 306 and accordingly the number of screed extension attachment systems 200 may be altered to achieve similar results without varying the scope of the claimed subject matter. For the sake of simplicity, the following description is provided with respect to one screed extension attachment system 200 coupled to one of the sets of mounting receptacles, such as the first set of mounting receptacles 314-316 on the mounting wall 306 of the screed extension 140.

Figure 5:
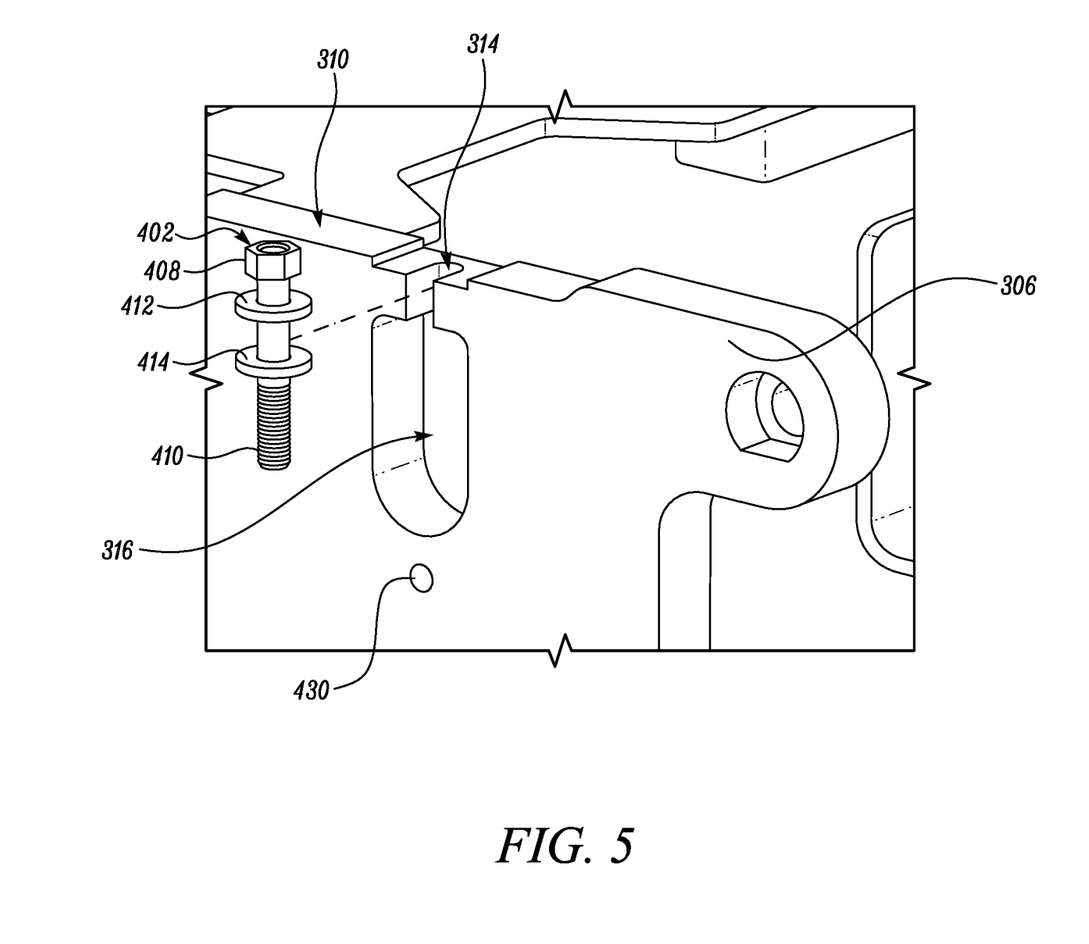
FIG. 5 illustrates a first mounting component of the screed extension attachment system positioned on a mounting wall of the screed extension, in accordance with the embodiments of the present disclosure.

In an embodiment of the present disclosure, the screed extension attachment system 200 includes a first mounting component 402, a second mounting component 404 disposed transversely to the first mounting component 402 and a mounting plate 406. In the illustrated example, the first mounting component 402 includes a bolt 408 having a first fastening member 410 and a pair of washers 412, 414, wherein the first fastening member 410 is a threaded end. The first mounting component 402 is configured to be disposed longitudinally along the mounting wall 306 and the second longitudinal axis 304 and engage within the first receptacle 314 on the mounting wall 306. As shown in FIG. 5, the first mounting component 402 engages with the first mounting receptacle 314 such that the bolt 408 is push fitted into the U-shaped receptacle 314 while the two washers 412, 414 hold the bolt 408 in position inside the first receptacle 314.

Figure 6:
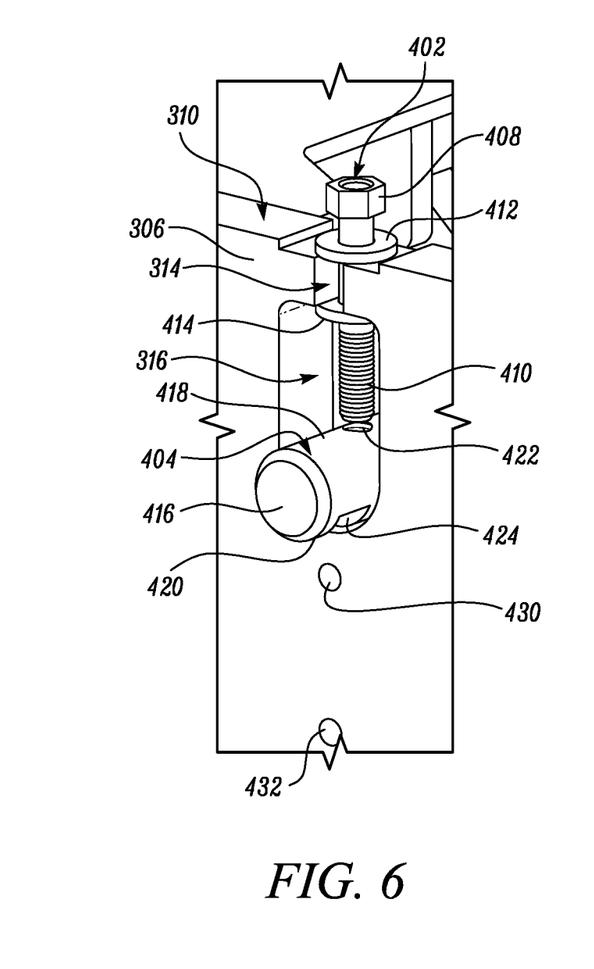
FIG. 6 illustrates a second mounting component of the screed extension attachment system positioned on the mounting wall of the screed extension, in accordance with the embodiments of the present disclosure.

As shown in FIGS. 4 and 6, the second mounting member 404 is disposed transversely to the first mounting component 402 and configured to be received within the second receptacle 316 on the mounting wall 306 of the screed extension 140. In an embodiment of the present disclosure, the second mounting component 404 includes a cylindrical hook assembly 416 defining a first curved side 418 and a second curved side 420 diametrically opposite to the first curved side 418. The second mounting component 404 includes a second fastening member 422, such as a threaded receptacle, formed on the first curved side 418, and configured to engage with the first fastening member 410 of the first mounting component 402. The second mounting component 404 is thus retained within the second receptacle 316 on the mounting wall 306 when the first fastening member 410 of the first mounting component 402 engages with the second fastening member 422 of the second mounting component 404. Although the first fastening member 410 and the second fastening member 422 are shown as threaded fasteners, it may be contemplated that other types of fastening members may also be implemented without deviating from the scope of the claimed subject matter.

In an embodiment of the present disclosure, the second mounting member 404 further includes a mounting catch 424 formed on the second curved side 420. The mounting catch 424 is configured to engage with the mating wall 144 of the main screed 122 or the external mating wall of another screed extension 140. For example, the mounting catch 424 is configured to engage with the respective catch protrusion 152, 154 on the mating wall 144 on the main screed 122. Alternatively, the mounting catch 424 may be configured to engage with the respective catch protrusion 326, 328 provided on the external mating wall 308 of another screed extension 140.

Figure 7:
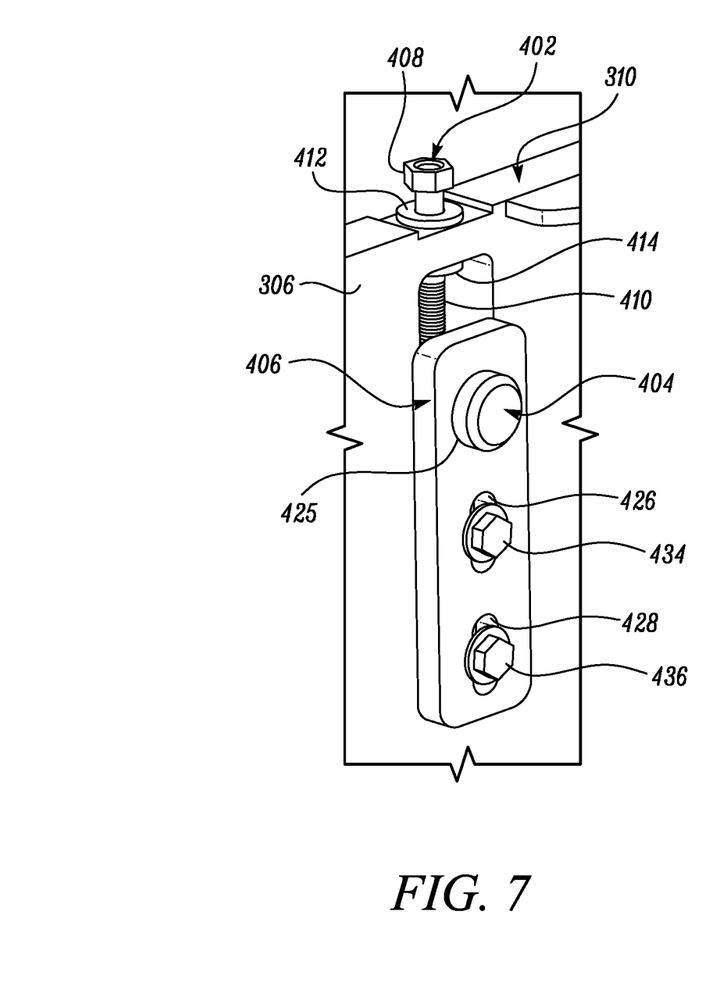
FIG. 7 illustrates a mounting plate of the screed extension attachment system secured to the mounting wall of the screed extension, in accordance with the embodiments of the present disclosure.

The screed extension attachment system 200 further includes the mounting plate 406 configured to be secured to the mounting wall 306 to secure the screed extension attachment system 200 to the screed extension 140. As shown in FIGS. 4 and 7, the mounting plate 406 includes a first engaging receptacle 425 configured to receive and engage with the second mounting component 404. Further, the mounting plate 406 includes a first fastening receptacle 426 and a second fastening receptacle 428 configured to receive fasteners 434 and 436 for securing the screed extension attachment system 200 on to the mounting wall 306 of the screed extension 140. As shown in FIG. 7, the first fastening receptacle 426 and the second fastening receptacle 428 on the mounting plate 406 are elongated receptacles configured to permit a levelling movement (upward and/or downward) of the screed extension attachment system 200 and the screed extension 140 when the screed extension 140 is attached to the main screed 122 or another screed extension 140 for aligning their respective leading and trailing edges.

As shown in FIGS. 5 and 6, the mounting wall 306 also includes complimentary fastening grooves, such as the first fastening groove 430 and a second fastening groove 432, such that the first and the second fastening receptacles 426, 428 on the mounting plate 406 align with the fastening grooves 432, 432 on the mounting wall 306 respectively to receive the fasteners 434, 436 therein. The first mounting component 402 engaged within the first receptacle 314, the second mounting component 404 engaged with the first mounting component 402 and the mounting plate 406 secured to the mounting wall 306, secure and hold the screed extension attachment system 200 on to the mounting wall 306.

Although the second mounting component 404 and the mounting plate 406 are shown and described to be two separate components, it may be contemplated by a person skilled in the art that the two can be formed into a single component without deviating from the scope of the claimed subject matter.

INDUSTRIAL APPLICABILITY

The screed extension attachment system 200 of the present disclosure facilitates easy and cost-effective attachment of a screed extension 140 to the main screed 122 or another screed extension to increase the paving width of the screed assembly 120. FIGS. 8 to 11 illustrate an exemplary method of attaching an exemplary screed extension 140 to the screed assembly 120, such as to the main screed 122 (as shown in FIG. 10) or to the other screed extension (as shown in FIG. 11).

Figure 8:
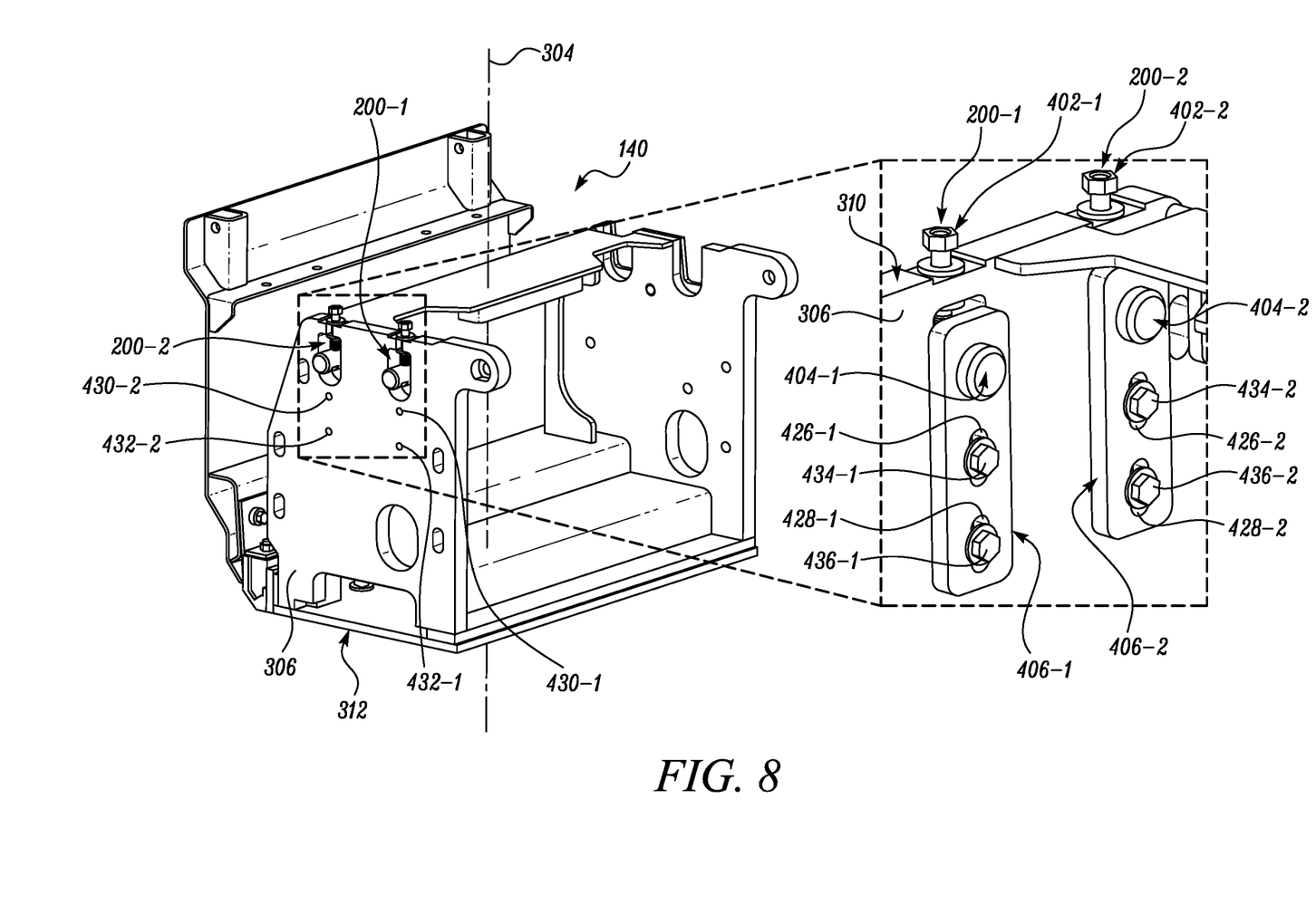
FIG. 8 illustrates the screed extension having a pair of screed extension attachment systems coupled thereto attach the screed extension to the screed assembly, in accordance with the embodiments of the present disclosure.

The method starts with initially assembling the screed extension 140 with the screed extension attachment systems 200-1, 200-2 to be retrofitted to the main screed 122 of the screed assembly 120. As shown in FIG. 8 and as explained previously, the first mounting components 402-1, 402-2 are positioned and push fitted into the first receptacle 314, 318 on the mounting wall 306 of the screed extension 140. Subsequently, the second mounting components 404-1, 404-2 are positioned in the second receptacles 316, 320 such that the first fastening member 310-310-2 on the first mounting components 402-1, 402-2 engage with the second fastening members 422-1, 422-2 on the second mounting component 404-1, 404-2.

Once the first and the second mounting components 402, 404 are positioned into the respective receptacles of the mounting wall 306, the mounting plates 406-1, 406-2 are positioned first to engage the second mounting components 404-1, 404-2 into the first engaging receptacle 425-1, 425-2.

Further, the mounting plates 406-1, 406-2 are aligned along the mounting wall 306 such that the first fastening receptacles 426-1, 426-2 on the mounting plates 406-1, 406-2 align with the respective fastening grooves 430-1, 430-2 and the second fastening receptacles 428-1, 428-2 on the mounting plates 406-1, 406-2 align with the respective fastening grooves 432-1, 432-2 on the mounting wall 306. Thereafter, the fasteners 434-1, 434-2, 436-1, 436-2 are received into the aligned fastening receptacles on the mounting plate 406 and the fastening grooves on the mounting wall 306, thereby securing the mounting plate 406 onto the mounting wall 306 of the screed extension. Consequently, the screed extension attachment systems 200-1, 200-2 are secured to the mounting wall 306 of the screed extension 140, thereby resulting in the assembled screed extension 140 to be retrofitted to the screed assembly 120.

In an exemplary embodiment of the present disclosure, the first fastening member 410-1, 410-2 of the first mounting component 402-1, 402-2 are not tightly engaged and fastened into the respective second fastening members 422-1, 422-2 on the second mounting component 404-1, 404-2 at the time of assembling the screed extensions 140 individually. The fastening members are tightened completely only when the screed extension 140 is attached to either the main screed 122 or to another screed extension 140.

Figure 9:
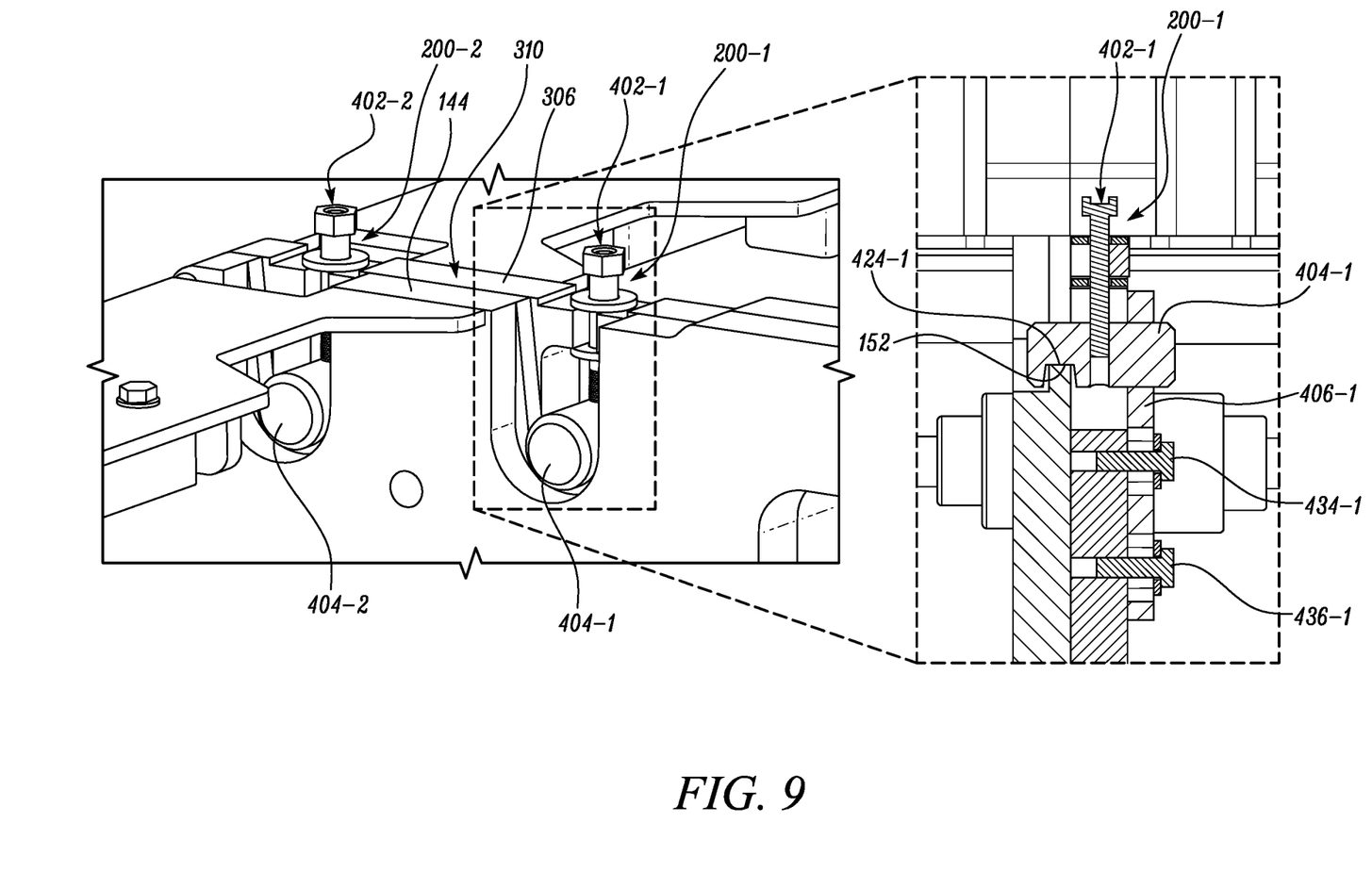
FIG. 9 illustrate exemplary step of positioning and aligning the mounting wall of the screed extension to a mating wall of the main screed of the screed assembly, in accordance with the embodiments of the present disclosure.
Figure 10:
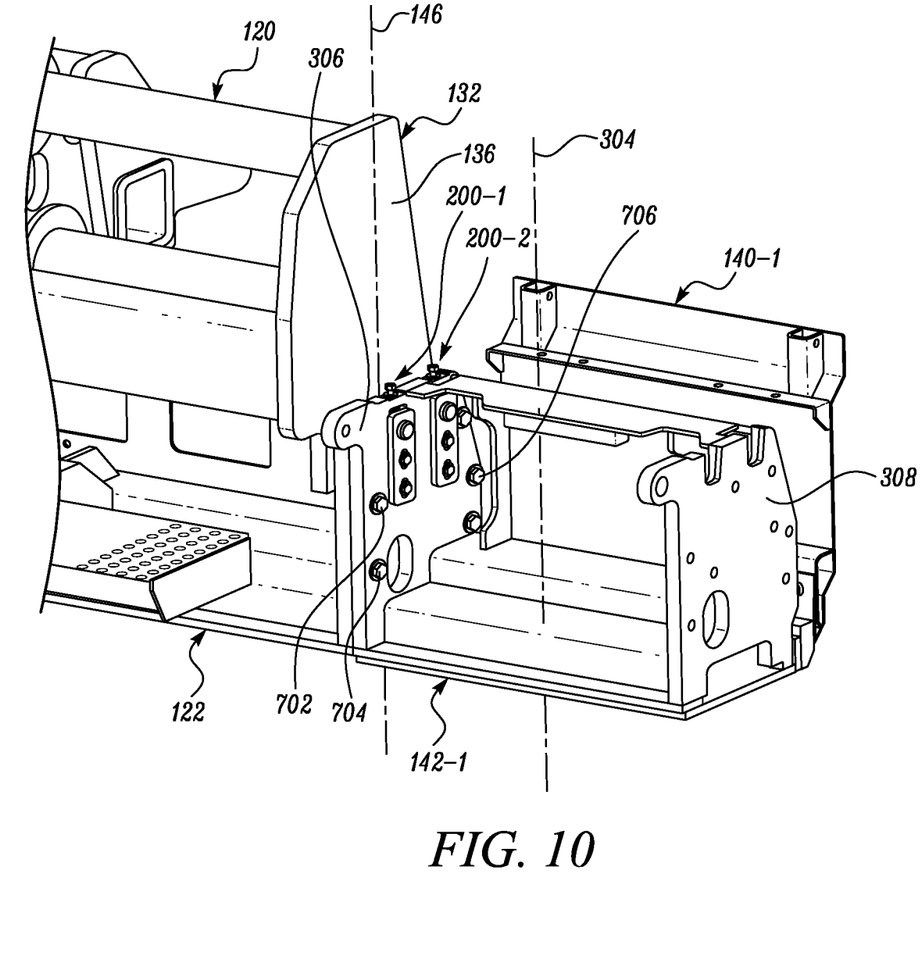
FIG. 10 illustrates the exemplary screed extension attached to the main screed of the screed assembly, in accordance with the embodiments of the present disclosure.
Figure 11:
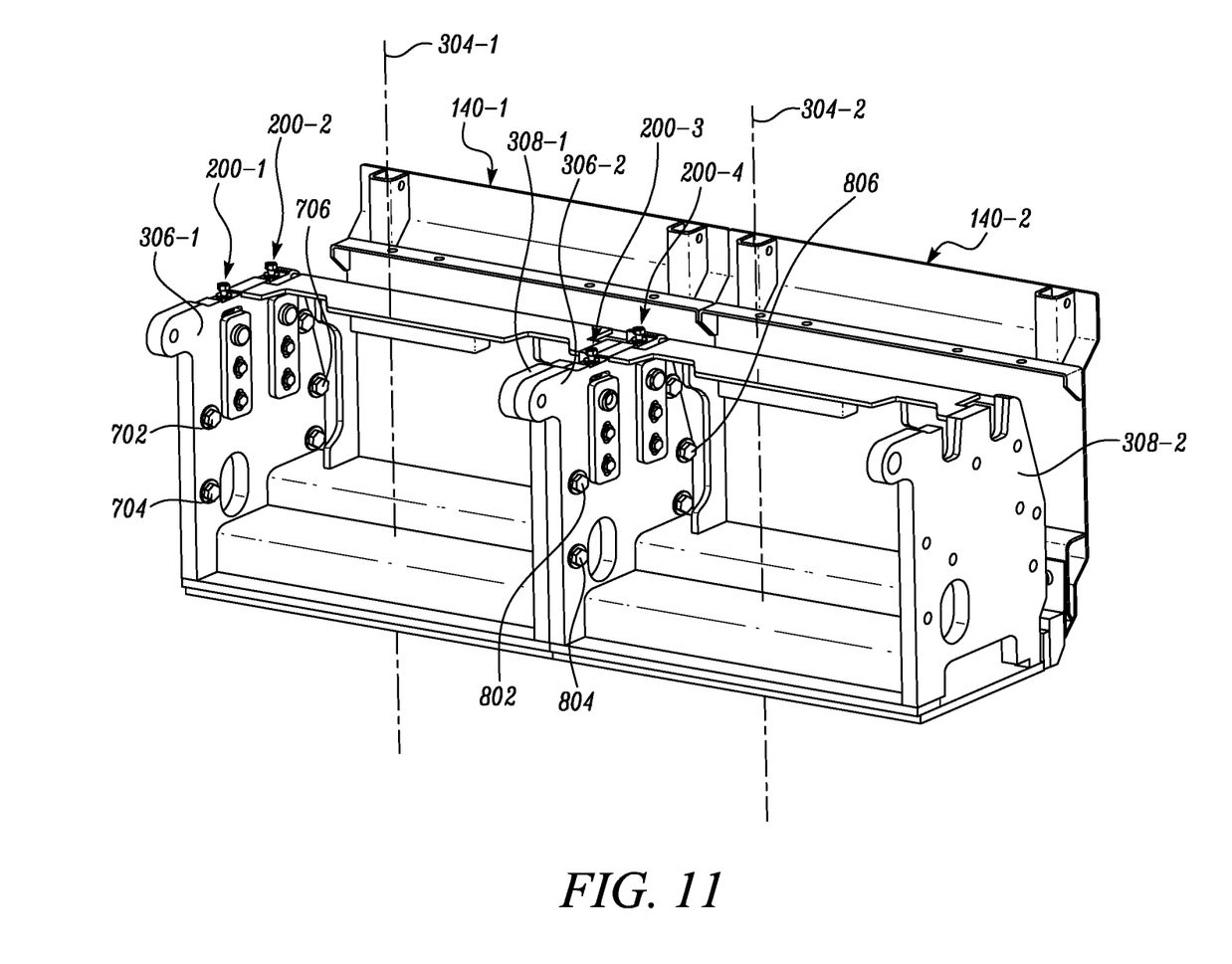
FIG. 11 illustrates an exemplary first screed extension attached to a second screed extension, in accordance with the embodiments of the present disclosure.

Referring to FIGS. 9 to 11, an exemplary method for attaching the screed extension 140 on to a mating wall on the screed assembly 120 is illustrated. For example, the screed extension 140 may be attached to the mating wall 144 of main screed 122 (as shown in FIG. 10) or to an external mating wall 308-2 of another screed extension 140-2 (as shown in FIG. 11).

As shown in FIG. 9, the mounting wall 306 having the screed extension attachments systems 200-1, 200-2 secured thereto, is positioned next to the mating wall 144 of the main screed 122. For example, the screed extension 140 is positioned to align the second receptacles 316, 320 on the mounting wall 306 with the cavities 148, 150 on the mating wall 144 of the main screed 122. In an embodiment of the present disclosure, the screed extension 140 is moved until the mounting catch 424-1 of the screed extension attachment system 200-1 engages with and sits on the catch protrusion 152 on the mating wall 144 of the main screed 122. Similarly, the mounting catch 424-2 of the screed extension attachment system 200-2 sits on the catch protrusion 154 on the mating wall 144 of the main screed 122. Once the mounting catches 424-1, 424-2 on the screed extension 140 engage with the respective catch protrusions 152, 154, the mating wall 144 and the mounting wall 306 align, thereby aligning the screed extension 140 with the main screed 122.

In an embodiment of the present disclosure, once the mounting catches 424-1, 424-2 engage with the catch protrusions 152, 154, the second mounting component 402-1, 402-2 is rotated in a first direction, such as clockwise, to tighten the fastening of the first fastening member 410-1, 410-2 into the second fastening member 422-1, 422-2 on the second mounting component 404-1, 404-2. The rotation of the first mounting component 402-1, 402-2 in the first direction may consequently push the screed extension attachment system 200-1, 200-2 and therefore the screed extension 140 downward. For example, the first mounting component 402-1, 402-2 may be rotated to level the screed extension 140 and align the leading and trailing edges of the main screed 122 and the screed extension 140, as shown in FIG. 10. Alternatively, if the screed extension 140 is fitted on to a main screed 122 that is worn out due to continuous operations, and/or when the leading and trailing edges of the main screed 122 lie above that of the screed extension 140, the first mounting component 402-1, 402-2 may be rotated in a second direction, such as anticlockwise, to pull the screed extension attachment system 200-1, 200-2 upwards, to level with the main screed 122.

Once the mounting catches 424-1, 424-2 are in suitable engagement with the mating wall 144 and the screed extension 140 is properly aligned with the main screed 122, the two are fastened together by four fasteners (only three shown in FIG. 10), such as fasteners 702, 704, 706. For example, the fasteners 702, 704, 706 may be nuts, bolts or any other type of fasteners used to secure the screed extension 140 to the main screed 122 of the screed assembly 120.

FIG. 11 illustrates an alternative embodiment of the present disclosure, where a first screed extension 140-1 is attached to a second screed extension 140-2 in a similar manner as described above. For example, the mounting wall 306-2 of the second screed extension 140-2 attaches to the external mating wall 308-1 of the first screed extension 140-1, such that the screed extension attachment systems 200-3, 200-4 engage with the external mating wall 308-1 in a similar manner as described above for the mating wall 144 in FIG. 9. Furthermore, the leading and trailing edges of the first screed extension 140-1 and the second screed extension 140-2 are aligned and levelled by rotating the first mounting component 402 as required. Subsequently, the first screed extension 140-1 and the screed extension 140-2 are secured together by four fasteners (only three shown), such as the fasteners 802, 804, 806. In some implementation, the first screed extension 140-1 may already be attached to the main screed 122 when the second screed extension 140-2 is attached to it, whereas in other implementations, the screed extensions 140-1, 140-2 may first be attached together and then the two may be attached to the main screed 122 of the screed assembly 120.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A system for attaching a screed extension to a screed assembly, the screed extension including a mounting wall, the system comprising:
   a first mounting component configured to be engaged within a first receptacle provided on the mounting wall, the first mounting component including a first fastening member; and
   a second mounting component configured to be received within a second receptacle provided on the mounting wall, the second mounting component including:
      a second fastening member to engage with the first fastening member of the first mounting component; and
      a mounting catch configured to engage with a mating wall of the screed assembly.

2. The system of claim 1, wherein the first mounting component is disposed longitudinally along the mounting wall and the second mounting component is disposed transversely to the first mounting component.

3. The system of claim 1, wherein the first mounting component includes a bolt and a pair of washers to engage with the first receptacle on the mounting wall of the screed extension.

4. The system of claim 3, wherein the first fastening member includes a threaded end to be engaged with the second fastening member on the second mounting component.

5. The system of claim 1, wherein the second mounting component includes a cylindrical hook assembly defining a first curved side and a second curved side diametrically opposite to the first curved side and wherein the second fastening member includes a threaded receptacle provided on the first curved side and the mounting catch being provided on the second curved side.

6. The system of claim 1 further comprising a mounting plate adapted to be secured to the mounting wall, the mounting plate including a first engaging receptacle to engage with the second mounting component and at least one fastening receptacle configured to receive a fastener for fastening the system with the mounting wall of the screed extension.

7. The system of claim 6, wherein the at least one fastening receptacle of the mounting plate is an elongated receptacle.

8. A screed extension for a screed assembly, the screed extension comprising:
   a mounting wall for attachment to a mating wall of the screed assembly, the mounting wall including:
      a first receptacle and a second receptacle; and
   a screed extension attachment system coupled to the mounting wall for attaching the screed extension to the screed assembly, the screed extension attachment system including:
      a first mounting component engaged with the first receptacle, the first mounting component including a first fastening member; and
      a second mounting component received within the second receptacle, the second mounting component including:
         a second fastening member engaged with the first fastening member of first mounting component; and
         a mounting catch configured to engage with the mating wall of the screed assembly.

9. The screed extension of claim 8, wherein the mounting wall extends along a longitudinal axis of the screed extension, the mounting wall defining a top end and a bottom end, and wherein the first receptacle is provided at the top end and extends transverse to the longitudinal axis and the second receptacle extends from the top end downwardly along the longitudinal axis.

10. The screed extension of claim 8, wherein the first mounting component includes a bolt and a pair of washers engaged within the first receptacle on the mounting wall of the screed extension.

11. The screed extension of claim 8, wherein the first fastening member includes a threaded end engaged within the second fastening member of the second mounting member.

12. The screed extension of claim 8, wherein the second mounting component includes a cylindrical hook assembly defining a first curved side and a second curved side diametrically opposite to the first curved side and wherein the second fastening member includes a threaded receptacle provided on the first curved side and the mounting catch provided on the second curved side.

13. The screed extension of claim 8, wherein the screed extension attachment system further includes a mounting plate secured to the mounting wall, the mounting plate including a first engaging receptacle engaged with the second mounting component and at least one fastening receptacle receiving a fastener for securing the screed extension attachment system with the mounting wall.

14. The screed extension of claim 13, wherein the at least one fastening receptacle of the mounting plate is an elongated receptacle.

15. The screed extension of claim 13, wherein the mounting wall includes at least one complementary fastening groove aligned with the at least one fastening receptacle of the mounting plate and receive the fastener to secure the screed extension attachment system with the mounting wall of the screed extension.

16. A screed assembly comprising:
a main screed defining a lateral extension axis and including a mating wall defining a first longitudinal axis, the mating wall including:
    a first cavity extending along the first longitudinal axis and defining
a catch protrusion therein;
a screed extension attached to the main screed, the screed extension including:
    a frame defining a second longitudinal axis parallel to the first longitudinal axis;
    a mounting wall attached to the mating wall of the main screed, the mounting wall extending along the second longitudinal axis and defining a top end and a bottom end, the mounting wall including:
        a first receptacle formed at the top end; and
        a second receptacle extending longitudinally downward from the top end along the second longitudinal axis, the second receptacle being aligned with the first cavity on the mating wall of the main screed; and
    a screed extension attachment system coupling the mounting wall of the screed extension with the side wall of the main screed, the screed extension attachment system including:
        a first mounting component positioned longitudinally along the mounting wall and engaged with the first receptacle, the first mounting component including a threaded end; and
        a second mounting component positioned transversely to the first mounting component and received within the second receptacle on the mounting wall, the second mounting component including:
            a first curved side and a second curved side diametrically opposite to the first curved side;
            a threaded receptacle formed on the first curved side and engaged with the threaded end of the first mounting component; and
            a mounting catch formed on the second curved side and engaged with the catch protrusion on the mating wall of the main screed.

17. The screed assembly of claim 16, wherein the first receptacle on the mounting wall of the screed extension extends transverse to the second longitudinal axis and the second receptacle extends along the second longitudinal axis of the screed extension.

18. The screed assembly of claim 16, wherein the first mounting component includes a threaded bolt and a pair of washers engaged within the first receptacle on the mounting wall of the screed extension.

19. The screed assembly of claim 16, wherein the screed extension attachment system further includes a mounting plate secured to the mounting wall, the mounting plate including a first engaging receptacle engaged with the cylindrical hook assembly and at least one fastening receptacle receiving a fastener and securing the screed extension attachment system with the mounting wall of the screed extension.

20. The screed assembly of claim 19, wherein the mounting wall of the screed extension further includes at least one complementary fastening groove aligned with the at least one fastening receptacle of the mounting plate and receive the fastener to secure the screed extension attachment system with the mounting wall of the screed extension.

* * * * *